United States Patent
Klug et al.

(10) Patent No.: US 11,159,591 B2
(45) Date of Patent: Oct. 26, 2021

(54) METHOD FOR TRANSMITTING DATA IN A MULTIMEDIA SYSTEM, AND SOFTWARE PRODUCT AND DEVICE FOR CONTROLLING THE TRANSMISSION OF DATA IN A MULTIMEDIA SYSTEM

(71) Applicant: RINGCENTRAL, INC., Belmont, CA (US)

(72) Inventors: Karl Klug, Miesbach (DE); Patrick Kleiner, Munich (DE)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 16/910,320

(22) Filed: Jun. 24, 2020

(65) Prior Publication Data

US 2020/0322400 A1    Oct. 8, 2020

Related U.S. Application Data

(63) Continuation of application No. 16/504,528, filed on Jul. 8, 2019, now Pat. No. 10,735,483, which is a
(Continued)

(30) Foreign Application Priority Data

Feb. 9, 2015    (DE) .......................... 102015001622.9

(51) Int. Cl.
*G06F 15/16*    (2006.01)
*H04L 29/06*    (2006.01)

(52) U.S. Cl.
CPC ........ *H04L 65/403* (2013.01); *H04L 65/1089* (2013.01); *H04L 65/4015* (2013.01)

(58) Field of Classification Search
CPC ............... H04L 65/403; H04L 65/1089; H04L 65/4015
(Continued)

(56) References Cited

U.S. PATENT DOCUMENTS 7,684,565 B2    3/2010  Medvinsky
7,710,912 B1 *   5/2010  Myles ....................... G06F 8/62
                                                          370/328

(Continued)

FOREIGN PATENT DOCUMENTS

CN        1830211 A      9/2006
CN      101061712 A     10/2007
(Continued)

OTHER PUBLICATIONS

Chinese Search Report for Chinese Patent Application Serial No. 201680009435X.
(Continued)

*Primary Examiner* — Melvin H Pollack
(74) *Attorney, Agent, or Firm* — Finnegan, Henderson, Farabow, Garrett & Dunner LLP

(57) ABSTRACT

Method and software product for transferring data, plus equipment for controlling data transfer in a multimedia system that includes a group of participants' terminals, with which multimedia data generated by participants' terminals contained in the group are sent to one or more participants' terminals contained in the group and played back there. A central synchronization unit generates synchronization labels containing time information and sends them to the participants' terminals contained in the group, and the synchronization labels are used to play back information in modified time.

20 Claims, 2 Drawing Sheets

Related U.S. Application Data continuation of application No. 15/549,879, filed as application No. PCT/EP2016/025007 on Feb. 8, 2016, now Pat. No. 10,389,771.

(58) Field of Classification Search
USPC .......................................................... 709/204
See application file for complete search history.

(56) References Cited

U.S. PATENT DOCUMENTS

| | | | |
|---|---|---|---|
| 7,924,929 B2* | 4/2011 | Meenakshisundaram | H04N 17/004 375/240.28 |
| 8,116,753 B2 | 2/2012 | Kim et al. | |
| 8,208,006 B2* | 6/2012 | Martin-Cocher | H04L 65/4023 348/14.12 |
| 8,327,028 B1* | 12/2012 | Shah | H04L 69/28 709/248 |
| 8,443,276 B2* | 5/2013 | O'Brien | H04N 21/8453 715/201 |
| 8,655,950 B2* | 2/2014 | Scherpa | G06Q 10/10 709/204 |
| 8,692,937 B2* | 4/2014 | Altmann | H04N 21/4307 348/513 |
| 8,717,894 B2 | 5/2014 | Zhang | |
| 8,761,568 B2* | 6/2014 | Ergin | H04N 21/4307 386/207 |
| 8,954,690 B2* | 2/2015 | Lawrence | G06F 16/181 711/154 |
| 8,965,954 B2* | 2/2015 | Palay | G06Q 10/107 709/203 |
| 9,015,245 B1* | 4/2015 | Lee | H04L 29/06476 709/204 |
| 9,015,301 B2* | 4/2015 | Redlich | G06F 16/26 709/223 |
| 9,049,270 B2 | 6/2015 | Poulain et al. | |
| 9,075,760 B2* | 7/2015 | Hwang | G06Q 50/01 |
| 9,104,738 B2 | 8/2015 | Kay et al. | |
| 9,131,256 B2* | 9/2015 | Hubner | H04N 21/6405 |
| 9,160,585 B2 | 10/2015 | Yang | |
| 9,237,179 B2 | 1/2016 | Stokking et al. | |
| 9,258,589 B2 | 2/2016 | Grouf et al. | |
| 9,374,359 B2* | 6/2016 | McCann | G06F 16/168 |
| 9,432,426 B2 | 8/2016 | Mao et al. | |
| 9,451,082 B2 | 9/2016 | Jiang | |
| 9,456,383 B2 | 9/2016 | Gopalan et al. | |
| 9,516,167 B2 | 12/2016 | Pirat et al. | |
| 9,582,738 B2* | 2/2017 | Brown | G06F 16/51 |
| 9,621,365 B2 | 4/2017 | Phan et al. | |
| 9,646,654 B2* | 5/2017 | Pajouh | G11B 31/006 |
| 9,665,895 B2 | 5/2017 | Alston | |
| 9,686,323 B1 | 6/2017 | Helter et al. | |
| 9,812,169 B2* | 11/2017 | O'Brien | H04N 21/6587 |
| 9,826,012 B2 | 11/2017 | Hao et al. | |
| 9,846,563 B2 | 12/2017 | Li | |
| 9,877,066 B2 | 1/2018 | Duong et al. | |
| 9,900,280 B2 | 2/2018 | Geppert et al. | |
| 9,900,477 B2 | 2/2018 | Park et al. | |
| 9,936,012 B2 | 4/2018 | Park | |
| 9,967,296 B2 | 5/2018 | He et al. | |
| 9,967,403 B1 | 5/2018 | Narayanaswamy | |
| 10,034,035 B2* | 7/2018 | Eber | H04N 21/274 |
| 10,282,228 B2* | 5/2019 | Vermeulen | G06F 9/466 |
| 10,382,720 B2 | 8/2019 | Serrano et al. | |
| 10,440,449 B2* | 10/2019 | Um | H04N 21/854 |
| 10,652,075 B2* | 5/2020 | Costa | G06Q 50/01 |
| 2001/0004767 A1 | 6/2001 | Gordon et al. | |
| 2002/0015421 A1 | 10/2002 | Ludwig et al. | |
| 2009/0157750 A1 | 6/2009 | Kim et al. | |
| 2011/0161836 A1 | 6/2011 | Mu et al. | |
| 2012/0151082 A1 | 6/2012 | Kang et al. | |
| 2013/0046831 A1* | 2/2013 | Schultz | G06F 21/6227 709/206 |
| 2013/0198285 A1* | 8/2013 | Ourega | H04L 67/22 709/204 |
| 2013/0282808 A1* | 10/2013 | Sadanandan | G06Q 10/10 709/204 |
| 2013/0297690 A1* | 11/2013 | Lucero | G06Q 10/101 709/204 |
| 2013/0325941 A1* | 12/2013 | Mann | H04L 45/304 709/204 |
| 2013/0325954 A1* | 12/2013 | Cupala | G06F 3/04847 709/204 |
| 2013/0330053 A1 | 12/2013 | Lee et al. | |
| 2014/0074923 A1* | 3/2014 | Vasudevan | G06F 21/10 709/204 |
| 2014/0081938 A1* | 3/2014 | Parker, III | G06F 16/252 707/705 |
| 2014/0082079 A1 | 3/2014 | Dunsmuir | |
| 2014/0095596 A1* | 4/2014 | Singh | H04M 3/42102 709/204 |
| 2014/0188990 A1 | 7/2014 | Fulks | |
| 2014/0195675 A1* | 7/2014 | Silver | H04L 65/607 709/224 |
| 2015/0127733 A1 | 5/2015 | Ding et al. | |
| 2015/0172843 A1 | 6/2015 | Quan | |
| 2015/0237464 A1 | 8/2015 | Shumaker et al. | |
| 2016/0065630 A1* | 3/2016 | Gupta | G06Q 10/10 709/204 |
| 2016/0099984 A1 | 4/2016 | Karagiannis et al. | |
| 2016/0255162 A1 | 9/2016 | Frieder et al. | |
| 2016/0316108 A1 | 10/2016 | Cooper | |
| 2016/0366566 A1 | 12/2016 | Kim et al. | |
| 2018/0159928 A1 | 6/2018 | Jin | |
| 2018/0376311 A1 | 12/2018 | Barnum et al. | |
| 2020/0027062 A1 | 1/2020 | Sitrick et al. | |

FOREIGN PATENT DOCUMENTS

| | | |
|---|---|---|
| CN | 103155584 A | 6/2013 |
| DE | 69433042 T2 | 6/2004 |
| DE | 60203779 T2 | 3/2006 |
| EP | 0898424 A2 | 2/1999 |
| EP | 2448265 A1 | 5/2012 |
| KR | 20090116145 A | 11/2009 |
| KR | 20120084252 A | 7/2012 |
| WO | WO 2005011281 A1 | 2/2005 |

OTHER PUBLICATIONS

International Search Report for PCT/EP2016/025007 dated May 2, 2016 (German).

Written Opinion of the International Searching Authority for PCT/EP2016/025007 dated May 2, 2016 (German).

* cited by examiner

METHOD FOR TRANSMITTING DATA IN A MULTIMEDIA SYSTEM, AND SOFTWARE PRODUCT AND DEVICE FOR CONTROLLING THE TRANSMISSION OF DATA IN A MULTIMEDIA SYSTEM

CROSS-REFERENCE TO RELATED APPLICATIONS

This application is a continuation application of, and claims the benefit of priority to U.S. patent application Ser. No. 16/504,528, filed on Jul. 8, 2019, which is a continuation application of, and claims the benefit of priority to U.S. patent application Ser. No. 15/549,879, filed on Aug. 9, 2017, which is the United States National phase application under 35 U.S.C. § 371 of PCT International Patent Application No. PCT/EP2016/025007, filed on Feb. 8, 2016, which claims the benefit of priority to German patent application no. 10 2015 001 622.9, filed on Feb. 9, 2015, the entire contents of all of which are incorporated by reference herein.

BACKGROUND OF THE INVENTION

Field of the Invention

Embodiments relate to methods for transferring data in a multimedia system plus a software product and equipment for controlling data transfer in a multimedia system.

Background of the Related Art

Audio and/or video are already known types of synchronous communication. In addition, e-mail, chat, IM, etc. (in general: text communication) are known forms of asynchronous communication. Synchronous communication existed in the past only as audio, video, or audio together with video. In addition to or parallel to those, there is asynchronous communication, e.g., in text form, which has a semantic relationship with synchronous communication. Many new types of communication have recently been introduced, such as e-mail, SMS, instant messaging, chat, twitter, YouTube, sensoring, QR tags, digital marking, etc. All of these communication forms together generate a dynamic context for the currently running synchronous communication.

To date, these various types of communication have not been synchronized, but rather must be resolved manually by the user or statically using network processes (during a managed video conference, for example). Even with video conferences, it often occurs that, due to the involvement of mobile participants, audio conferences are taking place in parallel to video conferences, which can impair lip synching. To date, only expensive video room systems have been able to solve this problem locally in the conference room.

DE 60203779 T2 describes an expansion of SDPng (ng: next generation), that uses the End-to-End Negotiation Protocol (E2ENP) to ensure End-to-End Quality of Service (QoS), even when mobile terminals are involved. The transmission conditions of mobile terminals can vary over time and are adapted dynamically. To do this, SDPng is used to pre-define a set of capabilities, qualities, and adapting mechanisms, so that a protocol can be defined at the application level.

According to US 2002154210 A1, a shared multimedia collaboration system makes it possible to send both synchronous (audio, video) communication and asynchronous communication (text, graphics, e-mail, controls).

Until now, synchronous and asynchronous communication have not been synchronized with each other, unless it was done manually, even when they are used in parallel and form a common dynamic context. This concerns in particular so-called "decomposed devices," whose capabilities such as audio and video transmission are assigned to separate devices.

BRIEF SUMMARY OF THE INVENTION

One purpose of the present invention is to provide an improved method for transferring data in a multimedia system, plus a software product and equipment for controlling data transfer in a multimedia system. These should in particular be able to at least in part overcome the existing disadvantages of the prior art.

One advantage of the invention lies in the fact that it concerns a method for transferring data in a multimedia system plus a software product and equipment for controlling data transfer in a multimedia system, which make it possible to reproduce multimedia data sent by transmitting participants' terminals in a defined time context so that they are in the same context when received by one or more receiving participants' terminals. Advantageously, it is possible to synchronize synchronous and asynchronous communication.

Embodiments provide methods and and software products for transferring data, plus equipment for controlling data transfer in a multimedia system that includes a group of participants' terminals (100, 200, 300), with which multimedia data generated by participants' terminals contained in the group are sent to one or more participants' terminals contained in the group and played back there. A central synchronization unit (ZTU) (500) generates synchronization labels containing time information and sends them to the participants' terminals (100, 200, 300) contained in the group. Each of the participants' terminals contained in the group receives the synchronization labels and attaches the received synchronization labels to the multimedia data generated in the participants' terminal and sends the multimedia data with the received synchronization labels attached to the central synchronization unit (500). The central synchronization unit receives the multimedia data with the attached synchronization labels and modifies the time information contained in the synchronization labels according to a time context for the multimedia data sent by the participants' terminals and sends it to the participants' terminals (100, 200, 300) to be played back. The multimedia data with the attached modified synchronization labels are received in the participants' terminals and played back in the time context corresponding to the modified time information contained in the synchronization labels.

BRIEF DESCRIPTION OF THE FIGURES

In the following, examples of embodiments of the invention are described in more detail based on figures. The figures show.

Figure 1:
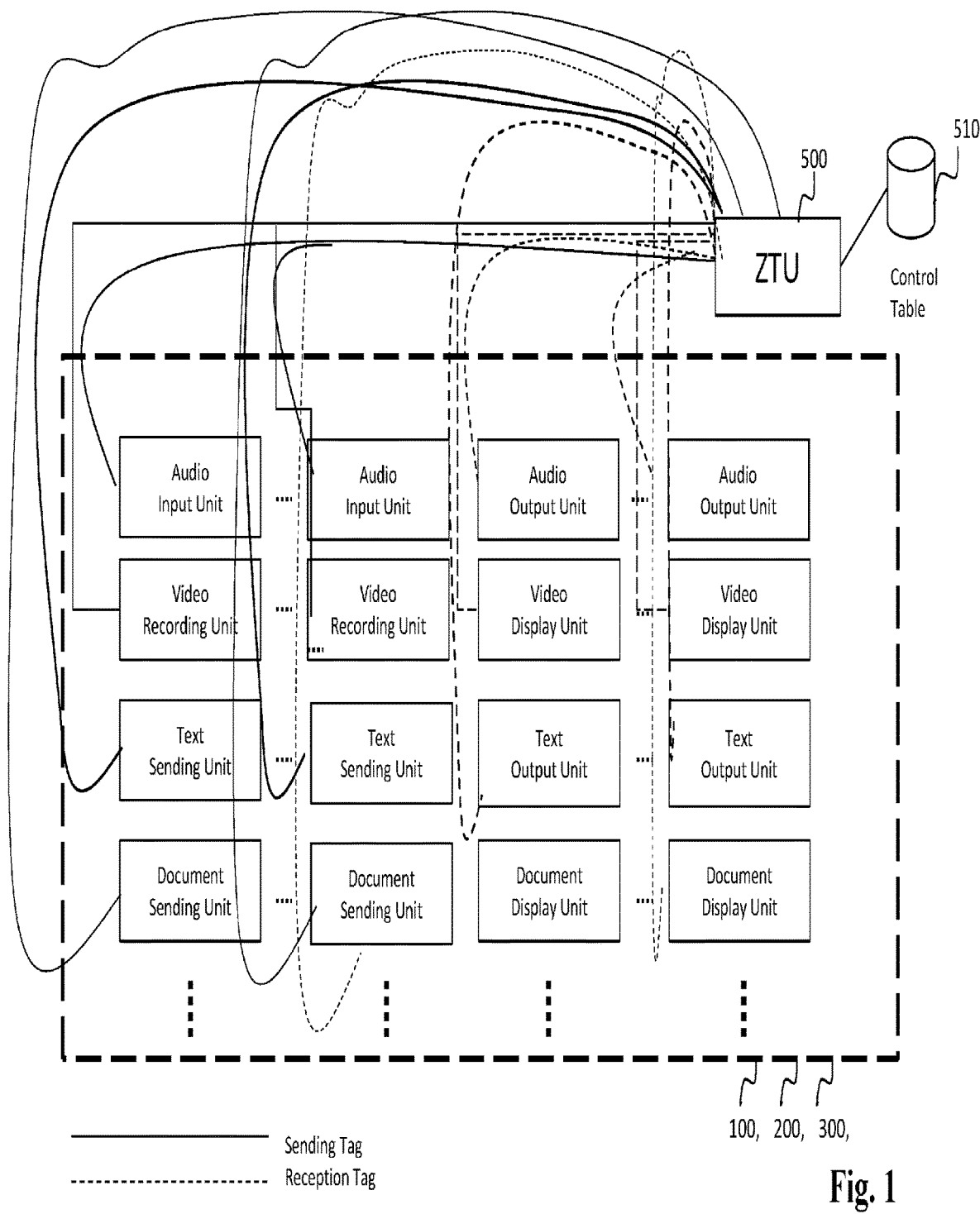
FIG. 1 a schematic representation of one part of a multimedia system, in which multimedia data are synchronized by a central synchronization unit (ZTU) on a terminal consisting of multiple input and output instances for different media types, e.g., a large-scale video system with one large screen and multiple smaller screens as well as several microphones arranged around the room and multiple speakers arranged around the room, according to one embodiment of the invented method.

The figures are schematic presentations and not according to scale. The graphic representations and their descriptions are intended only to illustrate the principle of the invention and shall in no way be understood as limiting the invention. Ideas and concepts that a person skilled in the prior art can understand and use are not explained specifically in the following descriptions.

DETAILED DESCRIPTION OF THE INVENTION

A first aspect of the invention concerns a method for transmitting data in a multimedia system that comprises a group of participants' terminals, in which multimedia data generated by participants' terminals contained in the group are sent to one or more participants' terminals contained in the group and played back there, wherein a central synchronization unit generates synchronization labels containing time information and sends them to the participants' terminals contained in the group, each participant's terminal contained in the group receives the synchronization labels and attaches the received synchronization labels to the multimedia data generated in the participant's terminal and sends the multimedia data with the received synchronization labels attached to the central synchronization unit. The the central synchronization unit receives the multimedia data with the synchronization labels attached and modifies the time information contained in the synchronization labels corresponding to a time context for the multimedia data sent by the participants' terminals and sends it to the participants' terminals for playback, and the multimedia data with the modified synchronization labels attached are received on the participants' terminals and played back in the time context corresponding to the modified time information contained in the synchronization labels.

According to one embodiment, the central synchronization unit receives the multimedia data with synchronization labels and modifies the time information contained in the synchronization labels corresponding to the control information which takes into account the properties of the participants' terminals that are sending and receiving the multimedia data and the properties of the transmission path.

In this embodiment, control information can be contained in a control table located in the central synchronization unit, which is used to generate the synchronization labels, which contain at least one context tag that describes the way the medium is used in the conversation, one conversation tag representing a unit of order for all the conversations managed by the central synchronization unit (ZTU), and one media tag describing the type of medium.

According to one embodiment, the control information, corresponding to which the time information contained in the synchronization labels is modified, is dynamically adapted.

The multimedia data can be transmitted in the form of data packets, and respective synchronization labels are assigned to the data packets.

According to this embodiment, data packets can be transmitted with differing lengths of time, whereby synchronization labels are generated corresponding to a periodic time sequence whose period length is equal to or shorter than the length of the data packet with the shortest period length.

According to one embodiment, the synchronization labels contain a time stamp.

According to another embodiment, the synchronization labels contain a counted value corresponding to the respective time and based on a preset starting time.

Another aspect of the invention concerns a software product that is stored on a computer-readable medium and can preferably be installed directly into the internal memory of a computer, in particular a central synchronization unit (ZTU), and has the program codes for a computer program enabling a computer to carry out the method steps of a method according to one of the preceding exemplary embodiments, when the computer program is run on the computer.

Another aspect of the invention concerns equipment for controlling the transmission of data in a multimedia system that comprises a group of participants' terminals, in which multimedia data generated by participants' terminals contained in the group are sent to one or more participants' terminals contained in the group and played back there, wherein the equipment comprises a central synchronization unit (ZTU) whose purpose is to generate synchronization labels containing time information and send them to each of the participants' terminals contained in the group, wherein the participants' terminals receive the synchronization labels and attach the received synchronization labels to the multimedia data generated in the participant's terminal and send the multimedia data with the received synchronization labels attached to the central synchronization unit, and the central synchronization unit is able to receive the multimedia data with the synchronization labels attached and modify the time information contained in the synchronization labels corresponding to a time context for the multimedia data sent by the participants' terminals and send it to the participants' terminals, wherein the multimedia data with the modified synchronization labels attached are to be received on the participants' terminals and played back in the time context corresponding to the modified time information contained in the synchronization labels.

FIG. 1 shows a schematic representation of one part of a multimedia system consisting of multiple input and output instances in the form of a group of terminals 100, 200, 300 for different media types. Only one of the terminals 100, 200, 300 is shown in FIG. 1.

The multimedia system includes, as later described with reference to FIG. 2, a group of participants' terminals 100, 200, 300, so that multimedia data generated by participants' terminals contained in the group are sent to one or more participants' terminals contained in the group and played back there. These can be, for example, a large-scale video system with one large screen and multiple smaller screens as well as several microphones arranged around the room and multiple speakers arranged around the room. However, the one or more terminals 100, 200, 300 can also include mobile telephones, video or PC cameras, or similar devices.

In the exemplary embodiment shown, as illustrated in FIG. 1, each of the terminals 100, 200, 300 contains an audio input unit, a video recording unit, a text sending unit, and a document sending unit, as well as an audio output unit, a video display unit, a text output unit, and a document display unit.

For the purpose of synchronizing the multimedia data, there is a central synchronization unit (also called "ZTU") 500 that is to generate synchronization labels containing time information and send them to the terminals 100, 200, 300 contained in the group, or at least those intended for receiving multimedia data.

A synchronization label, hereinafter called a "synchronization tag" or—especially in assemblies—briefly called a "tag" (from the English translation "tag" for the German word meaning "label"), in the exemplary embodiment described here consists of three logical segments, designated here as "context tag," "conversation tag," and "media tag." A context tag describes the way the medium is used in a conversation (e.g., real-time communication, static communication, streaming dataflow, etc.). A conversation tag represents a unit of order for all conversations managed by the ZTU 500 (e.g., ZTUxxx-nnnnn). A media tag describes the type of medium (e.g., dynamic video, streaming video, audio, podcast, text, document, image, etc.). There is one tag per media type in the sending and receiving directions.

The synchronization tags are generated either manually or automatically depending on the type of communication environment and placed in a data storage bank. A conversation tag can be a concatenation of a name assigned to the ZTU 500 and a numbering sequence, e.g., ZTU001-0027.

Figure 2:
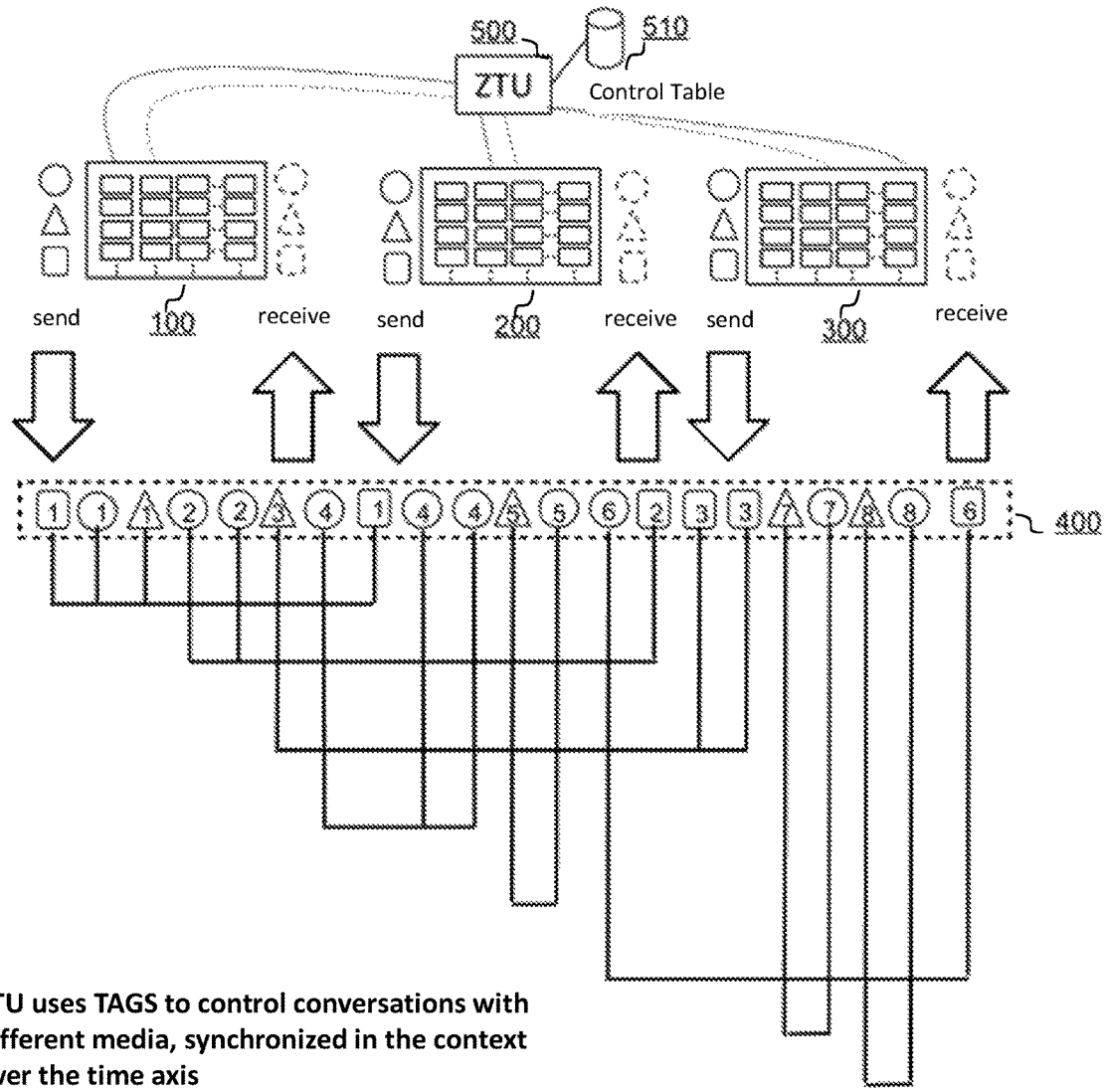
FIG. 2 a block diagram of one embodiment of the invention, in which a central synchronization unit (ZTU) synchronizes conversations containing multimedia data with different media in the context using synchronization labels (tags).

As now described with reference to FIG. 2, the central synchronization unit (ZTU) 500 sends the synchronization tags containing the time information to the participants' terminals contained in the group; for improved clarity, only three participants' terminals 100, 200, 300 of the type illustrated in FIG. 1 are shown in FIG. 2.

As already explained, multimedia data generated by one or more of the participants' terminals 100, 200, 300 contained in the group should be sent in the multimedia system to one or more of the other participants' terminals 100, 200, 300 contained in the group and played back there.

As shown schematically with solid lines in FIGS. 1 and 2, the central synchronization unit 500 sends the synchronization tags to each participant's terminal 100, 200, 300 contained in the group (or at least those intended for sending multimedia data), and each of these participants' terminals 100, 200, 300 receives the synchronization tags and attaches the received tags to the multimedia data generated in each participant's terminal 100, 200, 300, and then sends the multimedia data with the received synchronization tags attached to the central synchronization unit 500.

The central synchronization unit 500 receives the multimedia data with the attached synchronization tags and modifies the time information contained in the synchronization tags according to a time context for the multimedia data sent by the participants' terminals and then sends the multimedia data with the modified synchronization tags attached at least to the participants' terminals in the group of the participants' terminals 100, 200, 300, in which the multimedia data are to be played back. Transmission of the modified reception tags to the participants' terminals 100, 200, 300 is shown schematically with dashed lines in FIGS. 1 and 2.

In the participants' terminals in the group of participants' terminals 100, 200, 300, on which the multimedia data are to be played back, the multimedia data with the attached modified synchronization tags are received and played back in the time context corresponding to the modified time information. In other words, the central synchronization unit 500 controls the media streams in such a way that data packets with matching modified time information contained in the synchronization tags are played back in a time context, i.e., offered to the output units synchronously or at the proper time. "Synchronously or at the proper time" means playback in the sense of fulfilling a corresponding time context, not necessarily in the sense of "at the same time."

Buffering is used to ensure that media packets received late or at different times due to differing transmission or processing times are assembled for the same period, so that they can be made available for output at the same time. This can happen in various units, e.g., for documentation storage, at the customer's end, or in the conference unit.

The time information, provided in the form of a time stamp in the exemplary embodiment described here, is chosen such that the time stamp is entered synchronously with the shortest time interval, which is dependent upon the media channel used. For video, for example, a time stamp of 30 ms is normal. The synchronization unit 500 enters the modified centralized time stamps into the time stamps for the asynchronously received media packets. Standardized protocol elements, such as the RTC-P protocol that is used for SIP and WebRTC, can be used for this.

The multimedia data can be transmitted in the form of data packets, and respective synchronization labels can be assigned to the data packets.

Data packets can be transmitted with differing lengths of time, whereby synchronization tags are generated corresponding to a periodic time sequence whose period length is equal to or shorter than the length of the data packet with the shortest period length, e.g., the 30 ms mentioned above for video.

As an alternative to having the synchronization labels contain a time stamp, the synchronization tags can contain a counted value corresponding to the respective time and based on a preset starting time, similar to plesiochronous clocking.

The central synchronization unit 500 receives the multimedia data with synchronization tags attached and modifies time information contained in the synchronization tag corresponding to the control information, which takes into account the properties of the participants' terminals 100, 200, 300 that are sending and receiving the multimedia data and the properties of the transmission path, indicated in FIG. 2 with the reference 400.

In the exemplary embodiment described here, the control information is contained in a control table 510 located in the central synchronization unit. It is used to generate the synchronization tags. As already explained above, these can contain one context tag that describes the way the medium is used in the conversation, one conversation tag representing a unit of order for all the conversations managed by the central synchronization unit (ZTU), and one media tag describing the type of medium. Preferably, the control information, corresponding to which the time information contained in the synchronization tags is modified, is dynamically adapted.

The tags are generated either manually or automatically depending on the communication environment and placed in the control table in the manner of a data bank. A conversation tag can be displayed as a concatenation of the name of the ZTU 500 and a numbering sequence, e.g., ZTU001-0027.

In FIG. 2, media data belonging to a certain conversation on the transmission path 400, i.e., media data that are in the same time context, are indicated with the same numbers. Thus, eight conversations, numbered 1-8, are shown. The shapes of the outlines around the numbers, i.e., square, circle, or triangle, indicate the media type as well as the time requirement and priority for its transmission. Therefore, a circular outline indicates "audio" with the parameters: real time, high sensitivity, small packets, no packet loss, priority=1. A triangular outline indicates "video" with the parameters: real time, high sensitivity, large packets, no packet loss, priority=1, and a square outline indicates "text" with the parameters: large packets, low packet loss, priority=2. Priority=1 is ranked above priority=2.

The data transfer process in the multimedia system can be illustrated as follows: In a first step, the central synchronization unit (ZTU) 500 queries all units of the terminals 100, 200, 300 contained in the group for the respective media stream profiles. From that the ZTU 500 generates a send tag (S-tag) consisting of the previously explained context, conversation, and media tag components. The S-tag is sent periodically by the ZTU 500 to the (input) units of the terminals 100, 200, 300, which then attach the same tag to their media streams and send them. The run times from the ZTU 500 to the terminals are negligible. The length of the shortest period for a medium is 30 ms, for example. To minimize the message volume, as already explained above, a starting point, period length, and number of periods can be sent to the terminals 100, 200, 300.

The central synchronization unit 500 controls the media streams in such a way that a tag is attached to the packets (data, audio, video, streaming, IM, chat, etc.) when they are generated in the sending terminal 100, 200, 300, and packet and tag are sent as one expanded packet. The ZTU 500 is a work-flow engine type whose operation is table-controlled. Stored in the control table 510 is the sequence in which the respective reception tags (R tags) are sent to the terminals 100, 200, 300 intended for reception. This results in a chronological order for the media types included in a particular communication context, which prevents any out-of-queue occurrences in the system, for example. The synchronization unit 500 controls the media streams such that, for example, packets with the same time stamp are sent at the same time to the output units of the terminals 100, 200, 300 intended for reception.

Differing processing times on different terminals 100, 200, 300 to be synchronized (e.g., video and mobile phone) are taken into account in the control table and can be dynamically adapted if necessary.

The fact that the terminals (e.g., video and mobile phone) have no mutual or corresponding time basis (i.e., each terminal has its own "clock" and they are not synchronized) is taken into account by having the terminals replicate the tag received from the central synchronization unit 500. The ZTU 500 thus serves as a central synchronization instance, consolidating multiple partially linear independent media streams into one context.

The input units of the terminals 100, 200, 300 send their data packets with the respective tag to the ZTU 500. When all data packets belonging to one tag have arrived, the ZTU 500 generates an R-tag (reception tag), replacing the S-tag in the data packets, and sends the data packets to the receiver(s) in the form of the terminals 100, 200, 300. In this way, the media data streams from different, physically separate data sources of an endpoint are synchronized, so that lip-synchronization between the video data stream from a camera and the independent audio data stream from a telephone is achieved.

Alternatively, in place of or in addition to the central synchronization unit (ZTU) 500, a local synchronization unit (LTU) can be used to synchronize the data streams of one single endpoint. A "decomposed device" appears together with its assigned LTU as a single physically uniform terminal.

The invention claimed is:

1. A computer-implemented method for modifying multimedia data, the method comprising:
   generating a synchronization label comprising time information;
   attaching the synchronization label to the multimedia data;
   modifying the time information according to a time context for the multimedia data to generate modified multimedia data; and
   causing the modified multimedia data to be played.

2. The computer-implemented method of claim 1, wherein causing the modified multimedia data to be played comprises causing the modified multimedia data to be played in accordance with the time context.

3. The computer-implemented method of claim 1, wherein attaching the synchronization label to the multimedia data comprises attaching the synchronization label to a data packet.

4. The computer-implemented method of claim 1, wherein generating the synchronization label comprises generating the synchronization label to correspond to a periodic time sequence.

5. The computer-implemented method of claim 4, wherein the period time sequence comprises a period length equal to or shorter than a data packet with a shortest period length.

6. The computer-implemented method of claim 1, wherein the synchronization label further comprises a context tag, a conversation tag, or a media tag.

7. The computer-implemented method of claim 1, wherein the time information is based on a preset starting time.

8. A non-transitory, computer-readable medium, storing instructions that, when executed by a processor, causes:
   generating a synchronization label comprising time information;
   attaching the synchronization label to multimedia data;
   modifying the time information according to a time context for the multimedia data to generate modified multimedia data; and
   causing the modified multimedia data to be played.

9. The non-transitory, computer-readable medium of claim 8, wherein causing the modified multimedia data to be played comprises causing the modified multimedia data to be played in accordance with the time context.

10. The non-transitory, computer-readable medium of claim 8, wherein attaching the synchronization label to the multimedia data comprises attaching the synchronization label to a data packet.

11. The non-transitory, computer-readable medium of claim 8, wherein generating the synchronization label comprises generating the synchronization label to correspond to a periodic time sequence.

12. The non-transitory, computer-readable medium of claim 11, wherein the period time sequence comprises a period length equal to or shorter than a data packet with a shortest period length.

13. The non-transitory, computer-readable medium of claim 8, wherein the synchronization label further comprises a context tag, a conversation tag, or a media tag.

14. The non-transitory, computer-readable medium of claim 8, wherein the time information is based on a preset starting time.

15. A multimedia system, comprising:
   a processor;
   a memory operatively connected to the processor and storing instructions that, when executed by the processor, causes:
      generating a synchronization label comprising time information;
      attaching the synchronization label to multimedia data;

modifying the time information according to a time context for the multimedia data to generate modified multimedia data; and causing the modified multimedia data to be played.

16. The multimedia system of claim 15, wherein causing the modified multimedia data to be played comprises causing the modified multimedia data to be played in accordance with the time context.

17. The multimedia system of claim 15, wherein attaching the synchronization label to the multimedia data comprises attaching the synchronization label to a data packet.

18. The multimedia system of claim 15, wherein generating the synchronization label comprises generating the synchronization label to correspond to a periodic time sequence.

19. The multimedia system of claim 18, wherein the period time sequence comprises a period length equal to or shorter than a data packet with a shortest period length.

20. The multimedia system of claim 15, wherein the time information is based on a preset starting time.

* * * * *